United States Patent [19]
Tibiletti

[11] Patent Number: 5,275,548
[45] Date of Patent: Jan. 4, 1994

[54] MOLD FOR MAKING SEALS, IN PARTICULAR FOR GARMENT LABELS

[75] Inventor: Giuseppe Tibiletti, Milan, Italy

[73] Assignee: G.T. S.A.S. Di Giuseppe Tibiletti & C, Baranzate di Bollate, Italy

[21] Appl. No.: 974,827

[22] Filed: Nov. 16, 1992

Related U.S. Application Data

[62] Division of Ser. No. 602,642, Oct. 24, 1990, abandoned.

[30] Foreign Application Priority Data

Nov. 7, 1989 [IT] Italy ............................. 22295 A/89

[51] Int. Cl.⁵ ............................................. B29C 45/36
[52] U.S. Cl. .................................. 425/129.1; 264/318; 425/468; 425/577; 425/DIG. 10; 425/DIG. 58
[58] Field of Search ................ 425/129.1, 438, 468, 425/577, DIG.10, DIG.58; 264/318; 249/63, 64, 142, 145, 151, 176

[56] References Cited

U.S. PATENT DOCUMENTS

| | | | |
|---|---|---|---|
| 503,110 | 8/1893 | Denney | 292/320 |
| 570,127 | 10/1896 | Gogle | 292/320 |
| 937,575 | 10/1909 | Brooks | 292/320 |
| 954,271 | 4/1910 | Edgar | 292/320 |
| 3,058,158 | 10/1962 | Aghnides | 425/DIG. 58 |
| 3,431,967 | 3/1969 | Hipp, Jr. | 264/318 |
| 3,559,249 | 2/1971 | Patton, Jr. | 425/577 |
| 4,106,802 | 8/1978 | Lozio | 292/320 |
| 4,157,806 | 6/1979 | Bourdon et al. | 249/145 |
| 4,956,142 | 9/1990 | Mangone, Jr. | 425/577 |

FOREIGN PATENT DOCUMENTS 621438  6/1961  Italy .................................. 24/16 PB

*Primary Examiner*—Jay H. Woo
*Assistant Examiner*—James P. Mackey
*Attorney, Agent, or Firm*—Jacobson, Price, Holman & Stern

[57] ABSTRACT

A mold for making a seal for garment labels, the seal including a base body (11) and graft type elements (12) connected to the ends of a cord or thread (10) and insertable into the base body for connecting thereto. The graft type elements (12) engage in a seat (13) through opposite openings in the base body (11) and have resilient fingers (15) which hook into undercuts (14) in the seat (13) to prevent removal. The seat (13) extends longitudinally within the base body (11) and opens at the ends into openings in opposite side walls of the base body each opening defining with the seat an undercut (14) facing the opposite opening. A special mold (16) is required to produce the base body (11) in a single piece by plastic injection and has an internal cavity (24) with a form complementary to the external form of the base body (11) of the seal and into which enter from opposite directions corresponding to the position of the inlet openings in the seat (13) two forming rods (17, 17') each having a form to produce the seat without the undercuts (14) and having a head part (20, 20') shaped to form the undercuts (14) during the molding of the base body (11).

5 Claims, 3 Drawing Sheets

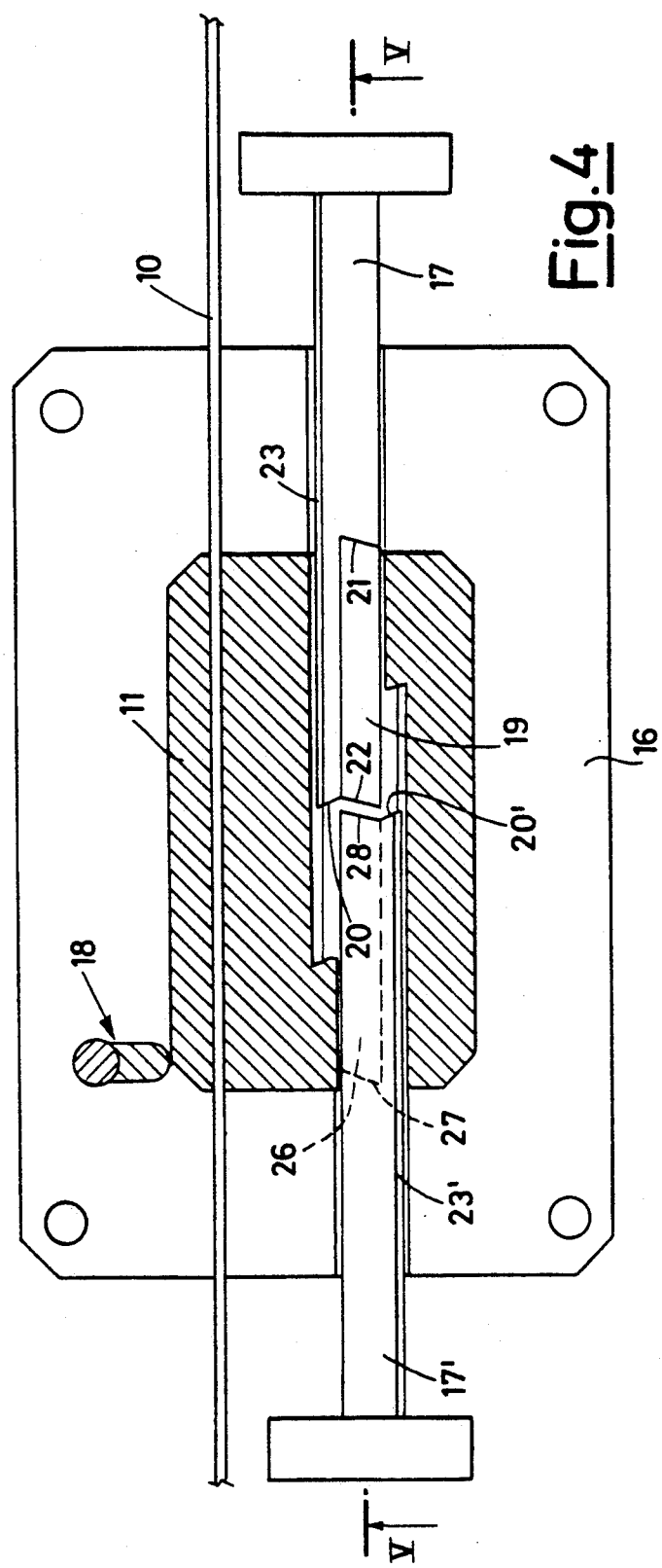
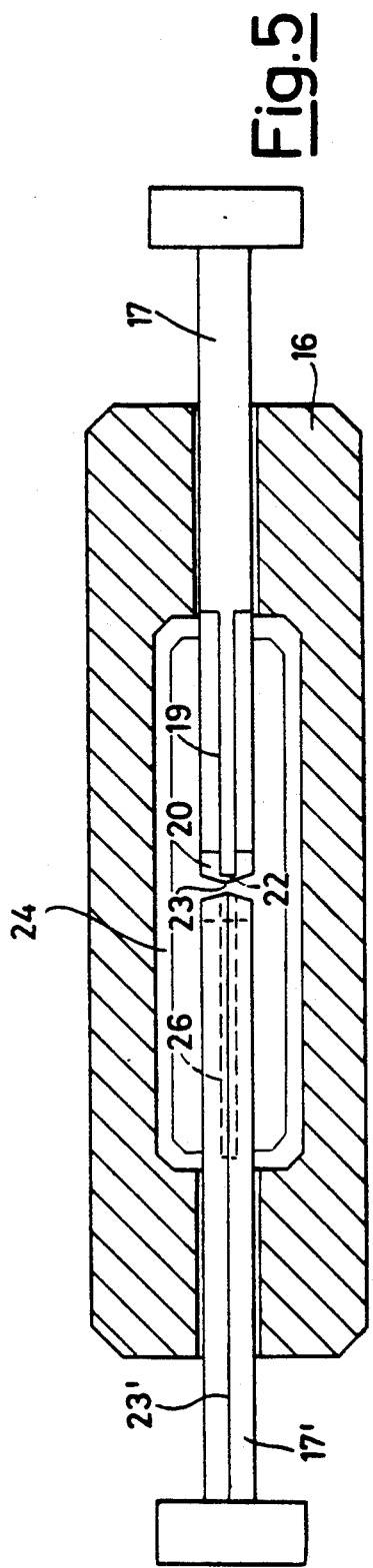

MOLD FOR MAKING SEALS, IN PARTICULAR FOR GARMENT LABELS

This is a divisional of application Ser. No. 07/602,642, filed Oct. 24, 1990 which was abandoned upon the filing hereof.

This invention relates to molds for making seals for garment labels.

Seals are known, particularly for fastening labels or other objects to garments and consisting of a flexible piece, e.g. a chord, with clips at the two ends to be joined inseparably.

In particular seals are known consisting of a base body from which emerge lengths of thread terminating in snap type inserts or graft type couplings to be inserted in recesses in the body. To provide the inseparable graft type coupling the recesses comprise internal undercuts which by interfering with elastic fins on the inserts prevent withdrawal of the inserts once they are inserted in the seats.

Generally the base body is provided in two half-shells to be assembled by glueing so as to allow molding with undercuts. Indeed, as may be easily imagined, in the known art the undercuts would prevent withdrawal of the forming boxes from the internal cavities of the base body if the latter were molded in a single piece.

But the necessity of glueing two half-shells to achieve a complete seal involves loss of time and added cost which translates into an increase of the final cost of the seal. In addition the closing operation slows down the production cadences which, without it, could be much higher.

BRIEF SUMMARY OF THE INVENTION

The general object of the present invention is to overcome the above drawbacks and provide a mold for making a garment label seal which would allow production of a base body in one piece despite the necessary provision of the internal undercuts.

It is a further object of the invention to overcome the above disadvantages by providing a mold for making a seal, in particular for garments, in which a base body and at least one graft type element connected by a length of thread and said graft type element being grafted in a complementary seat having an internal undercut to receive an elastic fin projecting from said graft type element in a direction opposite the direction of insertion thereof into the seat in such a manner as to constitute a block against withdrawal of the graft type element from the seat and characterized in that the seat extends longitudinally in the base body to open at the ends on two opposite walls of the base body with openings, for insertion of graft type elements, of width Sa less than the internal transverse width S of the seat, width Sa, also being greater than S/2, the openings of width Sa being close to opposite sides of the side walls of the seat and each having an undercut inside the seat and facing the opposite opening of width Sa.

It is another object of the invention to provide a mold for molding in a single piece by plastic injection the base body of a seal as described above, the mold having an internal cavity having a shape complementary to the external shape of the base body of the seal and in which enter from opposite directions opposite the position of the openings of width Sa two forming boxes, each of maximum transverse width equal to Sa and each forming box having a form of the seat without the undercut corresponding to its own inlet opening of width Sa and having part of the head shaped to form the undercut of the opposite opening.

BRIEF DESCRIPTION OF THE DRAWINGS

To further clarify the explanation of the innovative principles of the present invention and its advantages as compared with the known art the invention will be described in greater detail below with reference to the accompanying drawings, showing possible embodiments as an example of application of the principles and wherein:

FIG. 4 is a schematic plan view of an open mold in accordance with the invention and with a seal molded therein in cross section and forming boxes partially withdrawn;

FIG. 5 is a partially cross-sectional view taken along line V—V of FIG. 4;

DETAILED DESCRIPTION

Figure 1:
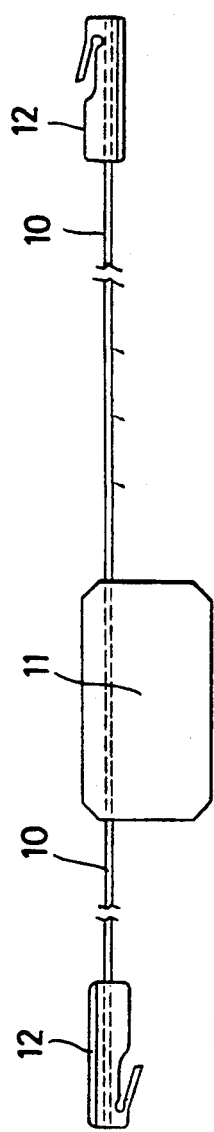
FIG. 1 is a schematic view of a seal molded in accordance with the invention.

With reference to the figures, FIG. 1 shows an example of an embodiment of a seal applying the innovative principles of the invention. The seal comprises a base body 11 and graft type elements 12 interconnected by a length of thread or cord 10.

Figure 2:
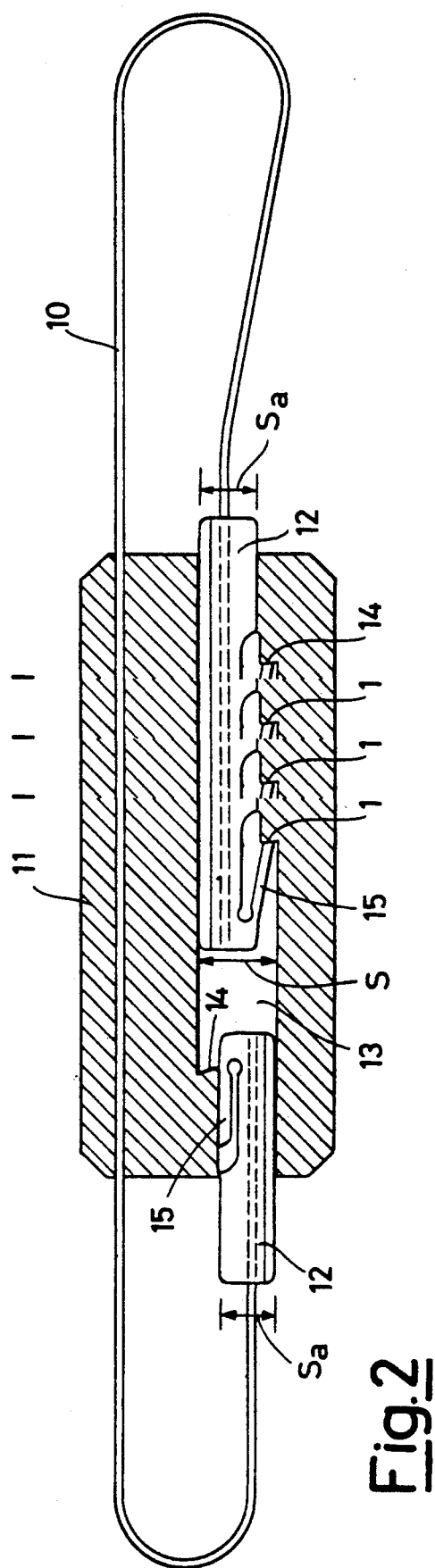
FIG. 2 is a partial cross sectional view of the seal of FIG. 1 in partial closing position.

FIG. 2 shows a cross section of a seal with corresponding graft type elements 12 inserted in the seats designed to receive them in the base body 11.

As may be seen in the figure the body 11 contains a seat 13 of width S with openings on opposite sides of said body of width Sa which is smaller than amplitude S but greater than S/2. The openings are arranged near opposite sides of the side walls of the seat so as to form two teeth 14 complementary to resilient fins 15 in the graft type elements 12 with each arranged in front of the opposite opening in the seat. As a whole the seat 13 between the two openings thus assumes a generally "Z" form.

Upon insertion of a graft type element in one of opening of seat 13 the fin 15 bends inwardly against the body of the graft type element and allows penetration thereof into the body (as shown with the graft type element on the left in the drawing) unit it passes the tooth 14 where it snaps outward (as shown on the right in the drawing) and prevents subsequent withdrawal.

To avoid errors in the direction of insertion of the graft type element and hence failure of the fin to engage with the associated tooth, the cross section thereof may be provided with a shape complementary to the seat in the body 11 and irreversible, i.e. it can be inserted in the seat only in such a manner that the fin faces the tooth 14.

Figure 3:
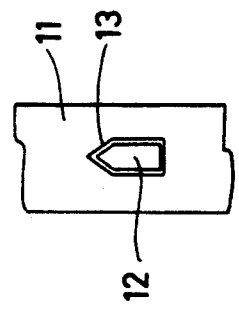
FIG. 3 is a partial side view of a possible configuration of parts of the graft type element of the seal of FIG. 2.

To achieve this it is enough that two opposite side walls of the graft type element be formed asymmetrically as shown for example in FIG. 3.

Since the seat 13 is completely closed by the insertion of opposing graft type elements 12 the seal assuredly cannot be opened without breaking it since it is impossible otherwise to reach the fins 15 to bend them outward from the undercuts.

In accordance with the invention, due to the peculiar form of the seat 13 it is possible to mold the body 11 in one piece by means of a box type mold as shown in FIGS. 4-7.

The mold consists of a matrix mold 16 (shown open in FIG. 6) with the opening 24 having the form of the body of the clip communicating with the two seats or grooves 25 for receiving the thread 10, a riser pipe 18 for injection of plastic, and grooves for two sliding rod shaped muldeores 17 and 17' transversely offset. As may be seen in FIGS. 4 and 5 the mold cores 17 and 17' have virtually constant transverse dimensions to allow their withdrawal after molding of the seal. Each mold core 17, 17' has a skewed head part 20, 20' respectively to form the teeth 14. To prevent moving of the mold core ends upon the entrance of the plastic into the mold there are provided guides and reciprocal rabbets thereon. In particular mold core 17 has a longitudinal part with reduced cross section 19 which slides into a complementary groove 26 arranged longitudinally in core 17'. In addition, to prevent side deviations part 19 terminates at the head end thereof with a skewed surface 22 to abut against the skewed end part 27 of the groove 26 and the head part of core 17, at the sides of the groove 26 also ends with a skewed surface 28 to abut against a corresponding skewed surface 21 at the end of part 19.

Figure 6:
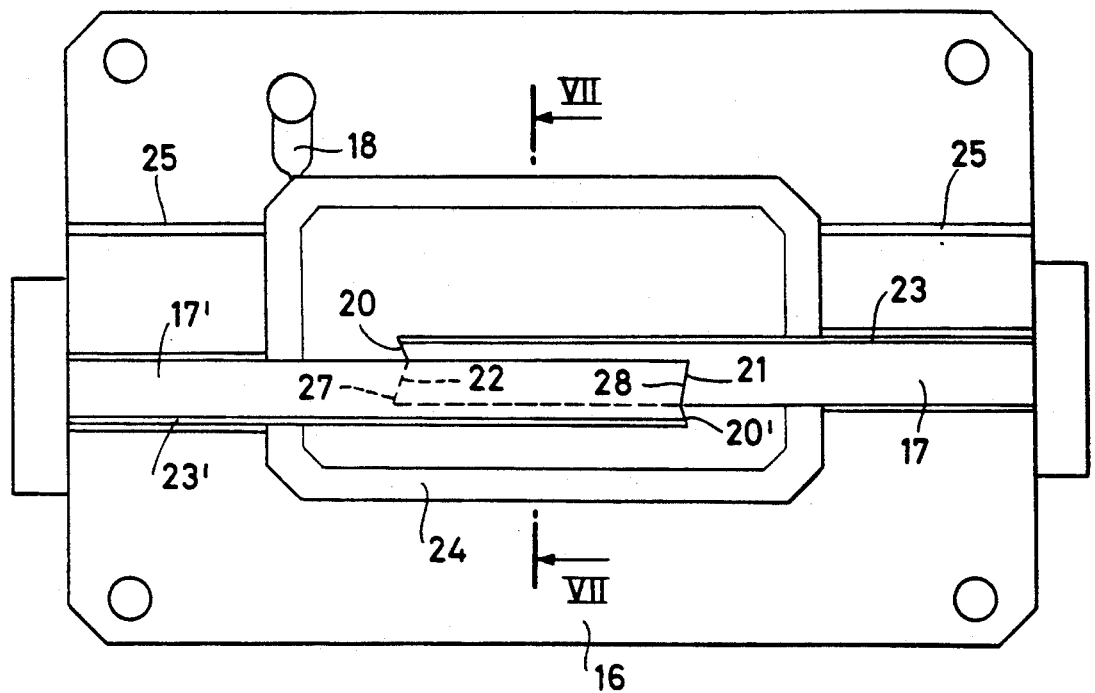
FIG. 6 is a plan view similar to FIG. 4 but without a seal and with forming boxes in the molding position.
Figure 7:
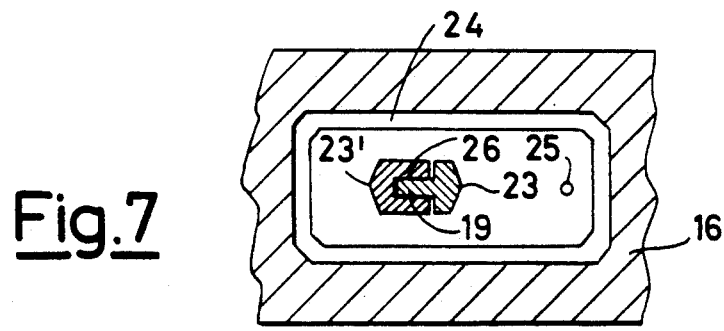
FIG. 7 is cross-sectional view taken along line VII—VII of FIG. 6.

In this manner upon closing of the cores in the molding position as shown in FIG. 6 there is achieved a solid positioning of the ends of the cores which support each other.

At this point it is clear how in accordance with the principles inspiring the present invention it is possible to mold a seal body in a single piece with undercuts inside for the inserts. The undercut for an insert is achieved by the mold core which forms the entrance seat for the other insert and vice versa. In this manner it is possible to provide the cores with virtually constant cross sections (or in any case not increasing in size between the base and the core head) and hence easily strippable after molding.

Figure 8:
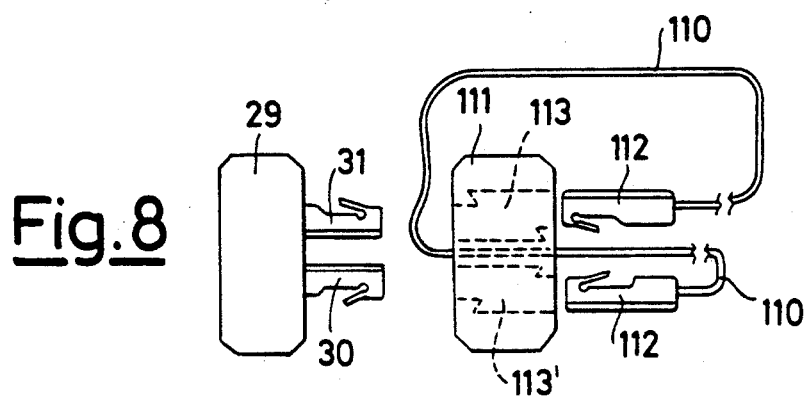
FIG. 8 is a schematic view of a second embodiment of the invention showing a different seal molded in accordance with the innovative principles thereof.

FIG. 8 shows another possible embodiment of a seal applying the innovative principles of the present invention. Elements having the same function as the above embodiment are indicated by the same reference numbers increased by one hundred.

The base body 111 has two seats 113 and 113' provided like the seats 13 of the embodiment described above and parallel so that there can be inserted from one side of the base body two inserts 112 connected thereto by a thread 110.

A plate element 29 has graft type projections 30 and 31 having a shape similar to that of the inserts 112 to be grafted in the seats 113 on the side opposite the side where the inserts 112 are inserted. Plate element 29 in addition to closing access to the seats 113 from the opposite side of the inserts and hence preventing tampering with the seal by pressure on the insert fins also makes it easy for example to customize the seals even after application to the garments. Indeed the plate 29 can be provided in various colors or on its surface can be glued self-adhesives or directly printed various indications such as trademarks, logos, dates of production of the sealed product, etc.

The mold necessary for production of the seal shown in FIG. 8 is not shown as it is readily imaginable by those skilled in the art as a derivation from the mold of FIGS. 4-7 with the mere addition of two additional mold cores and changing of the dimensions of the mold.

Naturally the description of an embodiment in accordance with the invention is given here merely as an example and is therefore not to be understood as limiting the scope of the invention here claimed.

For example the shaping of the inserts to prevent their insertion backward can be provided not only as shown in FIG. 3 but also more generally with appropriate variations of the thickness arranged transversely to the extension of the insert as may readily be imagined by those skilled in the art.

There can also be imagined a seal in accordance with the invention with a single insert connected by a thread to the base body and hence to the other opening in the seat closed for example by a graft type coupling projecting from a plate as shown in FIG. 8 but with a single graft type element.

The proportions of the various parts of the seals can also be varied.

Finally the coupling between the two mold cores to prevent sidewards movements upon injection of the plastic in the mold can be achieved in another form or be omitted entirely if the size of the seal and hence of the cores is such as to give them the necessary rigidity to prevent lateral deviations.

I claim:

1. A mold for producing by plastic injection a seal for garment labels, said seal having a base body, at least one snap type insert connected to said base body by a length of cord, a hollow cavity in said base body having shoulders therein at opposite sides of said cavity, opposite insert openings in said base body communicating with said cavity at said opposite sides of said cavity, said at least one insert being insertable through either one of said insert openings into said hollow cavity for coupling with said base body by a resilient fin on said at least one insert movable between a non-projecting position and a position projecting from said at least one insert so that upon insertion of said at least one insert into said cavity said fin is in said projecting position in abutting relationship with one of said shoulders in said cavity for retaining said at least one insert against withdrawal from said cavity, the mold comprising:

a mold body;

first and second opposite end portions on said mold body;

a mold cavity in said mold body having a shape complementary to the external shape of said base body for molding said base body of said seal;

first and second opposite ends in said mold cavity;

riser means connected to said mold cavity for injection of plastic material therethrough into said mold cavity for molding said base body of said seal;

at least one elongated hollow cord channel in said mold body having an internal end communicating with one of said ends of said mold cavity for receiving therein a part of said cord of said seal so that a part of said cord extends into said mold cavity during molding of said base body for connection to said base body;

mold core channels extending in substantially parallel offset relationship with respect to each other through said first and second end portions of said mold body and through said first and second ends of said mold cavity; and a longitudinal mold core reciprocally movable in each of said mold core channels for displacement into said mold cavity in a base body molding position and retraction from said mold cavity after said molding, said mold cores being disposed in parallel offset relationship with respect to each other, each mold core having a cross-sectional shape and external dimensions complementary to the cross-sectional shape and external dimensions of said insert in said non-projecting position of said fin, and an inner head end shaped to form said shoulders in said base body cavity, so that when said mold cores and said cord are in said molding position and plastic material is injected through said riser means into said mold cavity said mold cavity forms said base body and said mold cores form said hollow cavity, said insert openings and said shoulders in said base body.

2. The mold as claimed in claim 1 and further comprising:

cooperating guide and positioning means on said mold cores for guiding said mold cores during relative displacement thereof between said molding position and a retracted position, and for positioning said inner head ends for forming said hollow cavity and shoulders in said base body in said molding position.

3. The mold as claimed in claim 2 wherein said cooperating guide and positioning means comprise:

a longitudinal groove in one of said mold cores; and
a complementary longitudinal rib on the other of said mold cores slidingly engageable in said longitudinal groove.

4. The mold as claimed in claim 2 wherein said cooperating guide and positioning means comprise:

surfaces on the inner head end of each of said mold cores skewed relatively to the longitudinal direction thereof; and cooperating skewed surfaces on each of said mold cores engageable with said skewed surfaces on the inner head ends of the other of said mold cores in said molding position for supporting said inner head ends against lateral displacement thereof during injection of said plastic.

5. The mold as claimed in claim 3 wherein said cooperating guide and positioning means further comprise:

surfaces on the inner head end of each of said mold cores skewed relatively to the longitudinal direction thereof; and cooperating skewed surfaces on each of said mold cores engageable with said skewed surfaces on the inner head ends of the other of said mold cores in said molding position for supporting said inner head ends against lateral displacement thereof during injection of said plastic.

* * * * *

UNITED STATES PATENT AND TRADEMARK OFFICE
CERTIFICATE OF CORRECTION

PATENT NO. : 5,275,548

DATED : January 4, 1994

INVENTOR(S) : Giuseppe Tibiletti

It is certified that error appears in the above-indentified patent and that said Letters Patent is hereby corrected as shown below:

The drawing sheet, Figure 2, should be deleted and replaced with the drawing sheet, consisting of Figure 2, as shown on the attached page.

UNITED STATES PATENT AND TRADEMARK OFFICE
CERTIFICATE OF CORRECTION

PATENT NO. : 5,275,548

DATED : January 4, 1994

INVENTOR(S) : Giuseppe Tibiletti

Page 2 of 2

It is certified that error appears in the above-identified patent and that said Letters Patent is hereby corrected as shown below:

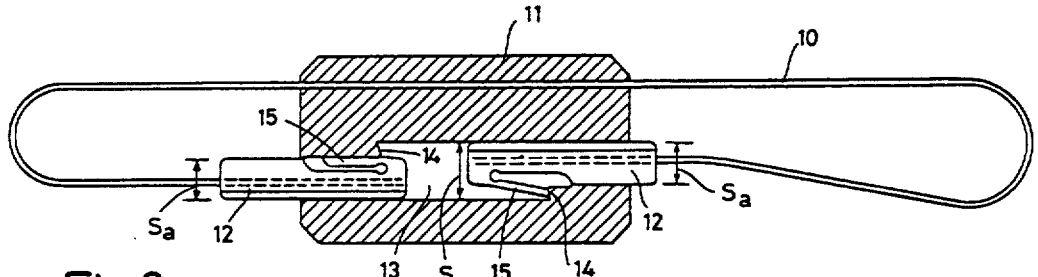

Fig.2

Signed and Sealed this

Eleventh Day of October, 1994

*Attest:*

*Attesting Officer*

BRUCE LEHMAN

*Commissioner of Patents and Trademarks*